(12) United States Patent
Padiyath et al.

(10) Patent No.: US 7,906,202 B2
(45) Date of Patent: Mar. 15, 2011

(54) TEAR RESISTANT SOLAR CONTROL MULTILAYER FILM

(75) Inventors: Raghunath Padiyath, Woodbury, MN (US); Stephen J. Strauss, Hastings, MN (US); Christopher A. Haak, Oakdale, MN (US); Douglas A. Huntley, Maplewood, MN (US)

(73) Assignee: 3M Innovative Properties Company, St.Paul, MN (US)

( * ) Notice: Subject to any disclaimer, the term of this patent is extended or adjusted under 35 U.S.C. 154(b) by 282 days.

(21) Appl. No.: 11/528,158

(22) Filed: Sep. 27, 2006

(65) Prior Publication Data

US 2008/0075948 A1    Mar. 27, 2008

(51) Int. Cl.
    B32B 7/02    (2006.01)

(52) U.S. Cl. ....... 428/212; 428/220; 428/328; 428/411.1

(58) Field of Classification Search ............. 428/328, 428/336, 411.1, 426, 40.1, 212, 220
    See application file for complete search history.

(56) References Cited

U.S. PATENT DOCUMENTS

| | | | |
|---|---|---|---|
| 5,233,465 A | 8/1993 | Wheatley et al. | |
| 5,360,659 A * | 11/1994 | Arends et al. | 428/216 |
| 5,427,842 A | 6/1995 | Bland et al. | |
| 5,604,019 A | 2/1997 | Bland et al. | |
| 6,040,061 A | 3/2000 | Bland et al. | |
| 6,087,010 A * | 7/2000 | Yoshida et al. | 428/421 |
| 6,124,417 A * | 9/2000 | Su | 526/318.44 |
| 6,249,085 B1 | 6/2001 | Arai | |
| 6,352,761 B1 | 3/2002 | Hebrink et al. | |
| 6,355,754 B1 | 3/2002 | Olson et al. | |
| 6,368,699 B1 | 4/2002 | Gilbert et al. | |
| 6,459,514 B2 | 10/2002 | Gilbert et al. | |
| 6,767,633 B2 | 7/2004 | Steudel et al. | |
| 6,797,396 B1 | 9/2004 | Liu et al. | |
| 6,827,886 B2 | 12/2004 | Neavin et al. | |
| 2001/0008700 A1 | 7/2001 | Jonza | |
| 2002/0090507 A1* | 7/2002 | Barth et al. | 428/336 |
| 2006/0154049 A1 | 7/2006 | Padiyath et al. | |

OTHER PUBLICATIONS

U.S. Appl. No. 11/535,731, filed Sep. 27, 2006, Zai-ming Qiu.
Glass Lock Designed Protection Brochure.

* cited by examiner

*Primary Examiner* — David R Sample
*Assistant Examiner* — Lawrence D Ferguson
(74) *Attorney, Agent, or Firm* — Jeffrey M. Olofson (57) ABSTRACT

A tear resistant solar control multilayer film article is disclosed. The multilayer film article includes an infrared light reflecting multilayer film having alternating polymeric layers of a first polymer type and a second polymer type and the alternating polymeric layers cooperate to reflect infrared light; an infrared light absorbing nanoparticle layer including a plurality of metal oxide nanoparticles dispersed in a cured polymeric binder, the infrared light absorbing nanoparticle layer being adjacent the infrared light reflecting multilayer film, and a tear resistant polymeric film disposed adjacent to the infrared light reflecting multilayer film.

20 Claims, 6 Drawing Sheets

TEAR RESISTANT SOLAR CONTROL MULTILAYER FILM

BACKGROUND

The present disclosure generally relates to tear resistant solar control multilayer film. The present disclosure more particularly relates to tear resistant solar control multilayer film that includes infrared absorbing nanoparticles.

Dyed and vacuum-coated plastic films have been applied to windows to reduce heat load due to sunlight. To reduce heat load, solar transmission is blocked in either the visible or the infrared portions of the solar spectrum (i.e., at wavelengths ranging from 400 nm to 2500 nm or greater.)

Primarily through absorption, dyed films can control the transmission of visible light and consequently provides glare reduction. However, dyed films generally do not block near-infrared solar energy and consequently are not completely effective as solar control films. Dyed films also often fade with solar exposure. In addition, when films are colored with multiple dyes, the dyes often fade at different rates, causing an unwanted color changes over the life of the film.

Other known window films are fabricated using vacuum-deposited grey metals, such as stainless steel, inconel, monel, chrome, or nichrome alloys. The deposited grey metal films offer about the same degrees of transmission in the visible and infrared portions of the solar spectrum. As a result, the grey metal films are an improvement over dyed films with regard to solar control. The grey metal films are relatively stable when exposed to light, oxygen, and/or moisture, and in those cases in which the transmission of the coatings increases due to oxidation, color changes are generally not detectable. After application to clear glass, grey metals block light transmission by approximately equal amounts of solar reflection and absorption.

Vacuum-deposited layers such as silver, aluminum, and copper control solar radiation primarily by reflection and are useful only in a limited number of applications due to the high level of visible reflectance. A modest degree of selectivity (i.e., higher visible transmission than infrared transmission) is afforded by certain reflective materials, such as copper and silver. Some vacuum deposited metal films can be adversely affected by weathering, and defects in the film can form, including corrosion of the metal layers.

Solar control films having high transparency and high heat rejection contain a significant amount of silver or silver gold alloys and are very conductive. As a result, the films block RF or microwave signals from being received in certain instances such as car radio, car navigation systems and such. In many applications, solar control window films that do not block RF signals is desirable.

Solar control films are applied to a glazing structured by spraying the glazing with water, positioning the film, trimming the film (if necessary) and squeegeeing the excess water trapped between glazing (typically glass) and the film. Some amount of water is typically trapped between the glazing and film. Vacuum deposited metal layers trap water between the film and the glazing. The trapped water collects and forms discrete bubbles which may take several months to be dissipate, if at all.

Tear resistant films (also referred to herein as shatterproof films) are tough films that can be used in either free-standing configurations, such as might be used in temporary structures such as wind breaks for construction and agriculture, or may be laminated to a rigid glass or plastic substrates to provide protection from impacts, such as may occur during strong winds, vehicle accidents or criminal activity. When used in a laminated structure, tear resistant films serve to absorb and distribute impact energy, as well as providing resistance to shattered fragments being ejected from the substrate.

There is a need for improved tear resistant solar control film that has a high visible light transmission and substantially blocks infrared radiation and also has low visible light reflection and has high moisture vapor transmission rates, is stable during exposure to weathering and also does not block or hinder RF signals.

SUMMARY

Generally, the present disclosure relates to tear resistant solar control multilayer film article. The present disclosure more particularly relates to a tear resistant solar control multilayer film article that includes infrared absorbing nanoparticles.

A tear resistant solar control multilayer film article is disclosed. The multilayer film article includes an infrared light reflecting multilayer film having alternating polymeric layers of a first polymer type and a second polymer type and the alternating polymeric layers cooperate to reflect infrared light; an infrared light absorbing nanoparticle layer including a plurality of metal oxide nanoparticles dispersed in a cured polymeric binder, the infrared light absorbing nanoparticle layer being adjacent the infrared light reflecting multilayer film, and a tear resistant polymeric film disposed adjacent to the infrared light reflecting multilayer film.

In a further embodiment, a shatterproof light control article for blocking infrared light from an infrared light source is disclosed. The shatterproof light control article includes an infrared light reflecting multilayer film having alternating polymeric layers of a first polymer type and a second polymer type and the alternating polymeric layers cooperate to reflect infrared light, an infrared light absorbing nanoparticle layer including a plurality of metal oxide nanoparticles dispersed in a cured polymeric binder, the infrared light absorbing nanoparticle layer being adjacent the infrared light reflecting multilayer film; a glass substrate disposed adjacent the infrared light reflecting multilayer film, and a tear resistant polymeric film disposed between the infrared light reflecting multilayer film and the glass substrate.

In another embodiment, a tear resistant multilayer film article includes an infrared light reflecting multilayer film having alternating polymeric layers of a first polymer type and a second polymer type and the alternating polymeric layers cooperate to reflect infrared light, an infrared light absorbing nanoparticle layer comprising a plurality of metal oxide nanoparticles dispersed in a cured polymeric binder, the infrared light absorbing nanoparticle layer being adjacent the infrared light reflecting multilayer film, and a tear resistant polymeric film disposed adjacent to the infrared light reflecting multilayer film. The tear resistant multilayer film article has an average visible light transmission of at least 40% and an infrared light transmission of 20% or less for substantially all wavelengths between 950 nm and 2500 nm.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

The present application may be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The tear resistant solar control multilayer film of the present disclosure is believed to be applicable to a variety of applications needing solar control including, for example, architectural and transportation applications. In some embodiments, the tear resistant solar control multilayer film article includes an infrared absorbing nanoparticle layer disposed on an infrared reflecting multilayer film and a tear resistant film. In other embodiments, the tear resistant solar control multilayer film article further includes an adhesive layer. The tear resistant solar control film can be adhered to an optical substrate such as, for example, a glass substrate. These examples, and the examples discussed below, provide an appreciation of the applicability of the disclosed solar control multilayer film and tear resistant solar control film, but should not be interpreted in a limiting sense.

The term "polymer" or "polymeric" will be understood to include polymers, copolymers (e.g., polymers formed using two or more different monomers), oligomers and combinations thereof, as well as polymers, oligomers, or copolymers. Both block and random copolymers are included, unless indicated otherwise.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

Weight percent, wt %, percent by weight, % by weight, and the like are synonyms that refer to the concentration of a substance as the weight of that substance divided by the weight of the composition and multiplied by 100.

The term "adjacent" refers to one element being in close proximity to another element and includes the elements touching one another and further includes the elements being separated by one or more layers disposed between the elements.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" include plural referents unless the content clearly dictates otherwise. Thus, for example, reference to a composition containing "a nanoparticle layer" includes two or more nanoparticle layers. As used in this specification and the appended claims, the term "or" is generally employed in its sense including "and/or" unless the content clearly dictates otherwise.

This disclosure generally describes tear resistant multilayer film that includes an infrared absorbing nanoparticle layer disposed on polymeric multilayer film. In many embodiments, an infrared light reflecting multilayer film has alternating layers of a first polymer type and a second polymer type, and an infrared light absorbing nanoparticle layer is adjacent the multilayer film. The nanoparticle layer includes a plurality of metal oxide nanoparticles. In some embodiments, the multilayer film is disposed adjacent to an optical substrate such as glass to form a solar control article.

FIGS. 1A-1C, 2 and 3 are optical transmission and reflection spectra of films prepared according to Examples 1-3.

Figure 4:
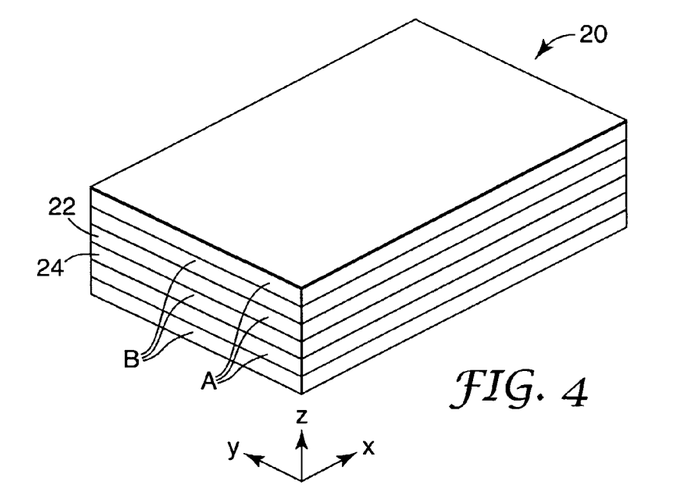
FIG. 4 is a perspective view of a multilayer film.

FIG. 4 illustrates multilayer optical film 20. The film includes individual layers 22, 24. The layers have different refractive index characteristics so that some light is reflected at interfaces between adjacent layers. The layers are sufficiently thin so that light reflected at a plurality of the interfaces undergoes constructive or destructive interference in order to give the film the desired reflective or transmissive properties. For optical films designed to reflect light at ultraviolet, visible, or near-infrared wavelengths, each layer generally has an optical thickness (i.e., a physical thickness multiplied by refractive index) of less than about 1 micrometer. Thicker layers can, however, also be included, such as skin layers at the outer surfaces of the film, or protective boundary layers disposed within the film that separate packets of layers.

The reflective and transmissive properties of multilayer optical film 20 are a function of the refractive indices of the respective layers (i.e., microlayers). Each layer can be characterized at least in localized positions in the film by in-plane refractive indices $n_x$, $n_y$, and a refractive index $n_z$ associated with a thickness axis of the film. These indices represent the refractive index of the subject material for light polarized along mutually orthogonal x-, y- and z-axes, respectively (see FIG. 4). In practice, the refractive indices are controlled by judicious materials selection and processing conditions. Film 20 can be made by co-extrusion of typically tens or hundreds of layers of two alternating polymers A, B, followed by optionally passing the multilayer extrudate through one or more multiplication dies, and then stretching or otherwise orienting the extrudate to form a final film. The resulting film is composed of typically tens or hundreds of individual layers whose thicknesses and refractive indices are tailored to provide one or more reflection bands in desired region(s) of the spectrum, such as in the visible, near infrared, and/or infrared. In order to achieve high reflectivities with a reasonable number of layers, adjacent layers preferably exhibit a difference in refractive index ($\Delta n_x$) for light polarized along the x-axis of at least 0.05. In some embodiments, if the high reflectivity is desired for two orthogonal polarizations, then the adjacent layers also exhibit a difference in refractive index ($\Delta n_y$) for light polarized along the y-axis of at least 0.05. In other embodiments, the refractive index difference $\Delta n_y$ can be less than 0.05 or 0 to produce a multilayer stack that reflects normally incident light of one polarization state and transmits normally incident light of an orthogonal polarization state.

If desired, the refractive index difference ($\Delta n_z$) between adjacent layers for light polarized along the z-axis can also be tailored to achieve desirable reflectivity properties for the p-polarization component of obliquely incident light. For ease of explanation, at any point of interest on a multilayer optical film the x-axis will be considered to be oriented within the plane of the film such that the magnitude of $\Delta n_x$ is a maximum. Hence, the magnitude of $\Delta n_y$ can be equal to or less than (but not greater than) the magnitude of $\Delta n_x$. Furthermore, the selection of which material layer to begin with in calculating the differences $\Delta n_x$, $\Delta n_y$, $\Delta n_z$ is dictated by requiring that $\Delta n_x$ be non-negative. In other words, the refractive index differences between two layers forming an interface are $\Delta n_j = n_{1j} - n_{2j}$, where j=x, y, or z and where the layer designations 1, 2 are chosen so that $n_{1x} \geq n_{2x}$, i.e., $\Delta n_x \geq 0$.

To maintain high reflectivity of p-polarized light at oblique angles of incidence, the z-index mismatch $\Delta n_z$ between layers can be controlled to be substantially less than the maximum in-plane refractive index difference $\Delta n_x$, such that $\Delta n_z \leq 0.5 * \Delta n_x$. More preferably, $\Delta n_z \leq 0.25 * \Delta n_x$. A zero or near zero magnitude z-index mismatch yields interfaces between layers whose reflectivity for p-polarized light is constant or near constant as a function of incidence angle. Furthermore, the z-index mismatch $\Delta n_z$ can be controlled to have the opposite polarity compared to the in-plane index difference $\Delta n_x$, i.e. $\Delta n_z < 0$. This condition yields interfaces whose reflectivity for p-polarized light increases with increasing angles of incidence, as is the case for s-polarized light.

Multilayer optical films have been described in, for example, U.S. Pat. No. 3,610,724 (Rogers); U.S. Pat. No. 3,711,176 (Alfrey, Jr. et al.), "Highly Reflective Thermoplastic Optical Bodies For Infrared, Visible or Ultraviolet Light"; U.S. Pat. No. 4,446,305 (Rogers et al.); U.S. Pat. No. 4,540,623 (Im et al.); U.S. Pat. No. 5,448,404 (Schrenk et al.); U.S. Pat. No. 5,882,774 (Jonza et al.) "Optical Film"; U.S. Pat. No. 6,045,894 (Jonza et al.) "Clear to Colored Security Film"; U.S. Pat. No. 6,531,230 (Weber et al.) "Color Shifting Film"; PCT Publication WO 99/39224 (Ouderkirk et al.) "Infrared Interference Filter"; and US Patent Publication 2001/0022982 A1 (Neavin et al.), "Apparatus For Making Multilayer Optical Films", all of which are incorporated herein by reference. In such polymeric multilayer optical films, polymer materials are used predominantly or exclusively in the makeup of the individual layers. Such films can be compatible with high volume manufacturing processes, and may be made in large sheets and roll goods.

The multilayer film can be formed by any useful combination of alternating polymer type layers. In many embodiments, at least one of the alternating polymer layers is birefringent and oriented. In some embodiments, one of the alternating polymer layer is birefringent and orientated and the other alternating polymer layer is isotropic. In one embodiment, the multilayer optical film is formed by alternating layers of a first polymer type including polyethylene terephthalate (PET) or copolymer of polyethylene terephthalate (coPET) and a second polymer type including poly(methyl methacrylate) (PMMA) or a copolymer of poly(methyl methacrylate) (coPMMA). In another embodiment, the multilayer optical film is formed by alternating layers of a first polymer type including polyethylene terephthalate and a second polymer type including a copolymer of poly(methyl methacrylate and ethyl acrylate). In another embodiment, the multilayer optical film is formed by alternating layers of a first polymer type including a glycolated polyethylene terephthalate (PETG—a copolymer ethylene terephthalate and a second glycol moiety such as, for example, cyclohexanedimethanol) or a copolymer of a glycolated polyethylene terephthalate (coPETG) and second polymer type including polyethylene naphthalate (PEN) or a copolymer of polyethylene naphthalate (coPEN). In another embodiment, the multilayer optical film is formed by alternating layers of a first polymer type including polyethylene naphthalate or a copolymer of polyethylene naphthalate and a second polymer type including poly(methyl methacrylate) or a copolymer of poly (methyl methacrylate). Useful combination of alternating polymer type layers are disclosed in U.S. Pat. No. 6,352,761, which is incorporated by reference herein.

Figure 5:
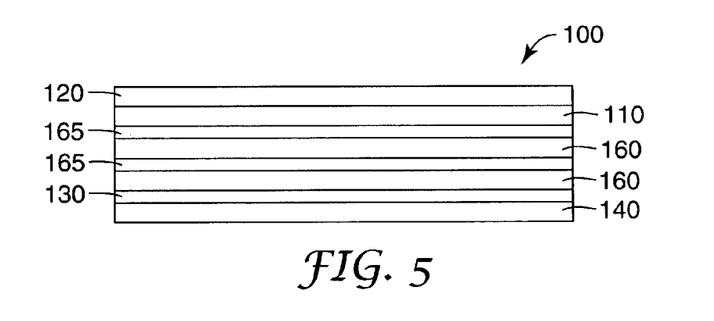
FIG. 5 schematically illustrates an embodiment of a tear resistant solar control multilayer film article.
Figure 6:
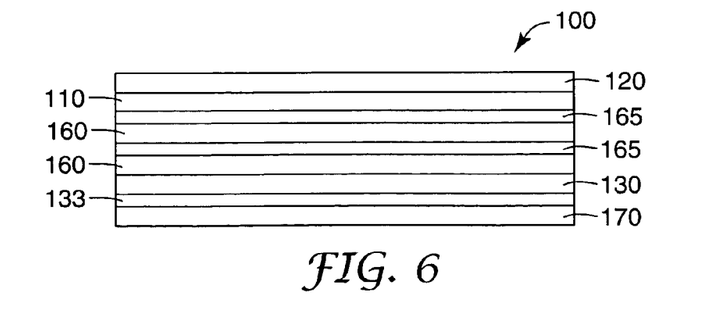
FIG. 6 schematically illustrates an embodiment of a tear resistant solar control multilayer film article.

FIG. 5 and FIG. 6 schematically illustrate embodiments of a tear resistant solar control multilayer film article 100. The film 100 includes an infrared light reflecting multilayer film 110 having alternating layers of a first polymer type and a second polymer type, as described above. The alternating polymeric layers cooperate to reflect infrared light. In many embodiments, the infrared light reflecting multilayer film 110 is substantially free of metal and is an all-polymeric film.

These tear resistant solar control films have a high transparency and high heat rejection and are non-conductive since they do not include traditional heat rejecting metal layers. As a result, these tear resistant solar films do not block RF or microwave signals from being received in certain instances such as car radio, car navigation systems and such.

An infrared light absorbing nanoparticle layer 120 (described below) is disposed adjacent the multilayer IR reflecting film 110. An optional intermediate adhesive layer (not shown) can be disposed between the nanoparticle layer 120 and the multilayer IR reflecting film 110. One or more monolithic or multilayer tear resistant films 160 (described below) are disposed adjacent to the infrared light reflecting multilayer film 110. Optional intermediate or laminating adhesive layer(s) 165 are disposed between the one or more tear resistant films 160 and between the one or more tear resistant films 160 and the infrared light reflecting multilayer film 110. Two tear resistant films 160 are shown in the illustrated embodiment.

A pressure sensitive adhesive layer 130 is disposed adjacent to the one or more tear resistant films 160. A release layer 170 or optical substrate 140 is disposed adjacent the pressure sensitive adhesive layer 130. In many embodiments, an overcoat layer 133 is disposed on the pressure sensitive adhesive layer 130.

The overcoat layer 133 can be a water soluble material that protects the pressure sensitive adhesive layer 130 from damage during manufacture and handling. A variety of water soluble materials such as methyl cellulose or polyvinyl alcohol are suitable as the overcoat material.

The tear resistant solar control multilayer film article 100 can be temporarily disposed on a removable release liner 170 which is discarded prior to installation of the article on the glazing member 140. The tear resistant solar control multilayer film article 100 can be prepared for application by removing the release liner 170 and rinsing the tear resistant solar control multilayer film article 100 with water to remove overcoat 133, thereby exposing and/or activating adhesive layer 130. The tear resistant solar control multilayer film article 100 is then applied to the glazing member 140 using conventional installation techniques known in the art. It has been found that the tear resistant solar control multilayer film article described herein provides a solar control film that allows the residual installation moisture to more readily transmit through the solar control film described herein, than through solar control films having deposited metal layers.

In many embodiments, the film 100 includes an infrared light reflecting multilayer film 110 having alternating layers of a first polymer type and a second polymer type, as described above and an infrared light absorbing nanoparticle layer 120 is disposed adjacent the multilayer film 110. In these embodiments, the infrared light absorbing nanoparticle layer 120 includes a metal oxide dispersed within a cured polymeric binder. In some embodiments, this infrared light absorbing nanoparticle layer 120 has a thickness in a range from 1 to 20 micrometers, or from 1 to 10 micrometers, or from 1 to 5 micrometers. In some embodiments, the infrared light absorbing nanoparticle layer 120 also functions as a hardcoat layer and comprises cured multifunctional polymeric material.

The nanoparticle layer described above can include a plurality of metal oxide nanoparticles. A partial listing of metal oxide nanoparticles includes tin, antimony, indium and zinc oxides and doped oxides. In some embodiments, the metal oxide nanoparticles include, tin oxide, antimony oxide, indium oxide, indium doped tin oxide, antimony doped indium tin oxide, antinomy tin oxide, antimony doped tin oxide or mixtures thereof. In some embodiments, the metal oxide nanoparticles include tin oxide or doped tin oxide and optionally further includes antimony oxide and/or indium oxide. The nanoparticles can have any useful size such as, for example, 1 to 100, or 1 to 75, or 5 to 50 nanometers. In some embodiments, the metal oxide nanoparticles include antimony tin oxide or doped antimony tin oxide dispersed in a polymeric material. The polymeric material can be any useful binder material such as, for example, polyolefin, polyacrylate, polyester, polycarbonate, fluoropolymer, and the like.

In many embodiments, the binder is a cured polymeric material that can function as a hardcoat. Suitable polymeric binders to form the infrared light absorbing nanoparticle layer include the thermal and/or U.V.-polymerized (i.e., cured) products of acrylate and/or methacrylate monomers. A suitable cured binder is the thermal and/or U.V.-polymerized product of a brominated, alkyl-substituted phenyl acrylate or methacrylate (e.g., 4,6-dibromo-2-sec-butyl phenyl acrylate), a methyl styrene monomer, a brominated epoxy diacrylate, 2-phenoxyethyl acrylate, and a hexa-functional aromatic urethane acrylate oligomer, as described in U.S. Pat. No. 6,355,754, incorporated herein by reference. While most types of energy polymerizable telechelic monomers and oligomers are useful for forming these polymeric binders, acrylates are preferred because of their high reactivity. The curable binder composition should be of flowable viscosity that is low enough that air bubbles do not become entrapped in the composition. Reactive diluents can be mono- or di-functional monomers such as, for example, SR-339, SR-256, SR-379, SR-395, SR-440, SR-506, CD-611, SR-212, SR-230, SR-238, and SR-247 available from Sartomer Co., Exton, Pa. Typical useful oligomers and oligomeric blends include CN-120, CN-104, CN-115, CN-116, CN-117, CN-118, CN-119, CN-970A60, CN-972, CN-973A80, CN-975 available from Sartomer Co., Exton, Pa. and Ebecryl 1608, 3200, 3201, 3302, 3605, 3700, 3701, 608, RDX-51027, 220, 9220, 4827, 4849, 6602, 6700-20T available from Surface Specialties, Smyrna, Ga. Additionally, a multi-functional crosslinker can assist in providing a durable, high crosslink density composite matrix. Examples of multi-functional monomers include SR-295, SR-444, SR-351, SR-399, SR-355, and SR-368 available from Sartomer Co., Exton, Pa. and PETA-K, PETIA and TMPTA-N available from Surface Specialties, Smyrna, Ga. Multi-functional monomers can be used as crosslinking agents to increase the glass transition temperature of the binder polymer that results from the polymerizing of the polymerizable composition.

In some embodiments, monomer compositions useful for forming the polymeric binder can have a melting point that is below about 50° C. The monomer composition can be a liquid at room temperature. Monomer compositions useful for forming the polymeric binder can be polymerized by conventional free radical polymerization methods. Examples of initiators include, organic peroxides, azo compounds, quinines, nitro compounds, acyl halides, hydrazones, mercapto compounds, pyrylium compounds, imidazoles, chlorotriazines, benzoin, benzoin alkyl ethers, di-ketones, phenones, and the like. Commercially available photoinitiators include, but not limited to, those available commercially from Ciba Geigy under the trade designations DARACUR 1173, DAROCUR 4265, IRGACURE 651, IRGACURE 1800, IRGACURE 369, IRGACURE 1700, and IRGACURE 907, IRGACURE 819. Phosphine oxide derivatives are preferred, such as LUCIRIN TPO, which is 2,4,6-trimethylbenzoy diphenyl phosphine oxide, available from BASF, Charlotte, N.C. A photoinitiator can be used at a concentration of about 0.1 to 10 weight percent or about 0.1 to 5 weight percent.

The polymerizable composition can form a hard resin or hardcoat. The term "hard resin" or "hardcoat" means that the resulting cured polymer exhibits an elongation at break of less than 50 or 40 or 30 or 20 or 10 or 5 percent when evaluated according to the ASTM D-882-91 procedure. In some embodiments, the hard resin polymer can exhibit a tensile modulus of greater than 100 kpsi ($6.89 \times 10^8$ pascals) when evaluated according to the ASTM D-882-91 procedure. In some embodiments, the hard resin polymer can exhibit a haze value of less than 10% or less than 5% when tested in a Taber abrader according to ASTM D 1044-99 under a load of 500 g and 50 cycles (haze can be measured with Haze-Gard Plus, BYK-Gardner, MD, haze meter.)

In some embodiments, the hardcoat can be a fluorine-based polymeric hardcoat that also can result in an easy to clean surface which has water contact angles in excess of 70 degrees. Examples of useful fluorine-based polymeric hardcoats include those described in co-pending patent application Ser. No. 11/535,731 entitled FLUOROACRYLATES AND HARDCOAT COMPOSITIONS INCLUDING THE SAME.

In some embodiments, the metal oxide nanoparticles include indium tin oxide or doped indium tin oxide dispersed in a polymeric material. The nanoparticle layer can have any useful thickness such as, for example, from 1 to 10 or 2 to 8 micrometers. The nanoparticle layer can include nanoparticles at any useful loading or wt % such as, for example, 30 to 90 wt %, 40 to 80 wt %, or 50 to 80 wt %. In many embodiments, the nanoparticle layer is nonconducting. The conductivity of the nanoparticle layer is often dependent on the concentration of the particles in the polymeric matrix. In many embodiments, the nanparticle layer has static disspative properties. Nanoparticle compositions are commercially available from, for example, Advanced Nano Products Co., LTD., South Korea, under the tradenames TRB-PASTE™ SM6080(B), SH7080, SL6060. In another embodiment, the metal oxide nanoparticles include zinc oxide and/or aluminum oxide, such oxides are available from GfE Metalle und Materialien GmbH, Germany.

The pressure sensitive adhesive (PSA) layer described above can be any type of adhesive that enables the tear resistant solar control multilayer article to be affixed to the glass. In order to attach the tear resistant solar control multilayer article to the glass, one surface of the tear resistant solar control multilayer article is coated with the pressure-sensitive adhesive (PSA) and a release sheet is removed from the PSA before application of the film to the glass. Ultra-violet absorption additives can be incorporated into the PSA. In many embodiments, the PSA is an optically clear PSA such as a polyacrylate pressure sensitive adhesive. The Pressure-Sensitive Tape Council has defined pressure sensitive adhesives as material with the following properties: (1) aggressive and permanent tack, (2) adherence with no more than finger pressure, (3) sufficient ability to hold onto an adherand, (4) sufficient cohesive strength, and (5) requires no activation by an energy source. PSAs are normally tacky at assembly temperatures, which is typically room temperature or greater (i.e., about 20° C. to about 30° C. or greater). Materials that have been found to function well as PSAs are polymers designed and formulated to exhibit the requisite viscoelastic properties resulting in a desired balance of tack, peel adhesion, and shear holding power at the assembly temperature. The most commonly used polymers for preparing PSAs are natural rubber-, synthetic rubber—(e.g., styrene/butadiene copolymers (SBR) and styrene/isoprene/styrene (SIS) block copolymers), silicone elastomer-, poly alpha-olefin-, and various (meth) acrylate—(e.g., acrylate and methacrylate) based polymers. Of these, (meth)acrylate-based polymer PSAs have evolved as a preferred class of PSA for the present invention due to their optical clarity, permanence of properties over time (aging stability), and versatility of adhesion levels, to name just a few of their benefits.

The release liner described above can be formed of any useful material such as, for example, polymers or paper and may include a release coat. Suitable materials for use in release coats include, but are not limited to, fluoropolymers, acrylics and silicones designed to facilitate the release of the release liner from the adhesive.

The optical substrate described above can be formed of any useful material. In some embodiments, the substrate is formed of a polymeric material such as, for example, cellulose triacetate, polycarbonate, polyacrylate, polypropylene, or polyethylene terephthalate. In other embodiments, the substrate is formed of an inorganic material such as, for example, quartz, glass, sapphire, YAG, or mica. The substrate can have any useful thickness. In one embodiment, the substrate is automotive or architectural glass. In some embodiments including clear glass substrates as a glazing system, the glazing system has a shading coefficient of 0.68 or less, or 0.6 or less, or 0.55 or less, or 0.50 or less, at a $T_{VIS}$ of 70% or greater.

In order to protect the solar control film for use on windows, the exposed surface of the multilayer film can optionally be coated with a scratch and wear resistant hardcoat. The hardcoat layer can improve the durability of the flexible substrate during processing and during use of the end product. The hardcoat layer can include any useful material, such as silica-based hardcoats, siloxane hardcoats, melamine hardcoats, acrylic hardcoats, and the like. The hardcoat can be any useful thickness such as, for example, from 1 to 20 micrometers, or 1 to 10 micrometers, or 1 to 5 micrometers. As described above, the infrared light absorbing layer can also function as a hardcoat layer, or an additional hardcoat layer can be disposed on the infrared light absorbing layer, as desired.

The intermediate adhesive described above can be formed of any useful material. In some embodiments, the intermediate adhesive layer includes a pressure sensitive adhesive material, as described above. In some embodiments, the intermediate adhesive layer includes a curable adhesive such as, for example a thermal or U.V. curable adhesive, as described above. The intermediate adhesive layer can have any useful thickness such as, for example, 1 to 100 micrometers, or 5 to 50 micrometers, or 10 to 50 micrometers, or 10 to 30 micrometers.

The intermediate polymeric layer described above can be formed of any useful material. In some embodiments, the intermediate layer includes a polyolefin, polyacrylate, polyester, polycarbonate, fluoropolymer, and the like. In one embodiment, the intermediate layer includes a polyethylene terephthalate. The intermediate polymeric layer can have any useful thickness such as, for example, 5 to 500 micrometers, or 10 to 100 micrometers, or 25 to 75 micrometers, or 25 to 50 micrometers.

Tear resistant solar control multilayer articles are applied to a glazing structured by spraying the glazing with water, positioning the film, trimming the film (if necessary) and squeegeeing the excess water trapped between glazing (typically glass) and the film. Some amount of water is typically trapped between the glazing and film which slowly diffuses through the film. In order to enable fast removal of the excess trapped water, the water vapor transmission rate (also known as MVTR) should be as high as possible.

In many embodiments, multilayer tear resistant film 160 includes alternating layers of stiff polymer and a ductile polymer. In some embodiments, the tear resistant film 160 includes alternating layers of stiff polyester or copolyester and a ductile sebacic acid based copolyester. In many embodiments, the stiff polyester or copolyester layers are oriented in at least one direction and, or are biaxially oriented. Examples of these tear resistant films are described in U.S. Pat. No. 6,040,061; U.S. Pat. No. 5,427,842; and U.S. Pat. No. 5,604,019 which are incorporated by reference herein to the extent they do not conflict with the present disclosure.

In another embodiment, the tear resistant film is a single monolithic polymeric film that provides a desired level of tear resistance. Such films are known in the art as "tough" polymeric film. Toughness can be described as a measure of the energy a polymer can absorb before it breaks, and examples of tough polymers include ABS (poly (acrylonitrile butadiene styrene)), LDPE (linear low density polyethylene), HIPS (high impact polystryrene), polyurethanes and the like. Additionally, increasing the thickness of the monolithic polymeric film may permit the usage of some polymers, such as PET and nylon, to be utilized as a tear resistant film. In many embodiments, these tear resistant monolithic polymeric films have a nominal thickness of at least 175 micrometers up to 1 centimeter, or from 250 micrometers to 5 millimeters or from 250 micrometers to 2 millimeters.

Many multilayer or monolithic tear resistant films according to this disclosure demonstrate a tensile modulus (as measured in a conventional tensile test) of at least 175 kpsi (1,208 MPa), or at least 240 kpsi (1,656 MPa), or at least 450 kpsi (3,105 MPa) in at least one direction of the film.

By "tear resistant" it is broadly meant that a multilayer film according to this disclosure demonstrates a tensile modulus (described above) and/or a Graves area in one direction of the film which exceeds the Graves area in the same direction for a single layer film comprising only the stiff polymer of the multilayer film, the single layer film being processed in the same manner as and to substantially the same thickness as the multilayer film. In many embodiments, the tear resistant solar control films demonstrate a Graves area in one direction of the film equal to at least about 40+0.4(x) kpsi % wherein x is the nominal thickness of the film in micrometers. More specifically, Graves area is obtained by mathematically integrating the area beneath the curve in a graphical plot of the stress (as measured in kpsi) experienced by the film versus the strain (as measured by Graves elongation in % which is defined more fully below) that the film undergoes during a test in which a film sample specifically shaped for the Graves area test is clamped between opposed jaws that are moved apart at a constant rate to concentrate the tearing stresses in a small area. Thus, Graves area is a combined measure of the film's tensile modulus (i.e., the film's stiffness and dimensional stability) and the ability of the film to resist advancing a tear. Consequently, Graves area may be regarded as a measure of the total energy required to cause the film to fail; that is, the ability of the film to absorb energy. In many embodiments, the tear resistant solar control films desirably exhibit a Graves elongation at break of at least 20%, or at least 40% during the Graves area test. The tear resistance solar control films may be measured by ASTM Test Method D 1004 (also known as a Graves tear test).

Both the thickness of the tear resistant multilayer film and the individual layers which comprise the tear resistant multilayer film may vary over wide limits. These films can have a nominal thickness of from about 7 to 500 micrometers, or from about 15 to 185 micrometers. The individual layers of stiff polyester or copolyester can have an average nominal thickness of at least about 0.5 micrometers, or from greater than 0.5 to 75 micrometers, or from about 1 to 25 micrometers. In some embodiments, the ductile sebacic acid based copolyester layers are thinner than the stiff polyester/copolyester layers. The ductile material layers may range in average nominal thickness from greater than about 0.01 micrometer to less than about 5 micrometers, or from about 0.2 to 3 micrometer. Similarly, the exact order of the individual layers is not critical. The total number of layers may also vary substantially. In many embodiments, the tear resistant multilayer film includes at least 3 layers, or from 5 to 35 layers, or from 10 to 15 layers.

Stiff polyesters and copolyesters according to this disclosure are typically high tensile modulus materials, preferably materials having a tensile modulus, at the temperature of interest, greater than 200 kpsi (1,380 MPa), and most preferably greater than 400 kpsi (2,760 MPa). Particularly preferred stiff polyesters and copolyesters comprise the reaction product of a dicarboxylic acid component selected from the group consisting of terephthalic acid, naphthalene dicarboxylic acid and ester derivatives thereof, and a diol component selected from the group consisting of ethylene gylcol and 1,4-butanediol. Additional stiff copolyesters based on these materials may also be provided by copolymerizing these ingredients with one or more other diacids and/or one or more other diols.

Ductile sebacic acid based copolyesters generally have a tensile modulus of less than 200 kpsi (1,380 MPa) and a tensile elongation (as defined below), at the temperature of interest, of greater than 50%, preferably greater than 150%. A preferred ductile copolyester comprises the reaction product of 20 to 80 (more preferably 70 to 50, and most preferably 60) mole equivalents terephthalic acid (or an ester derivative thereof), correspondingly, 80 to 20 (more preferably 30 to 50, and most preferably 40) mole equivalents sebacic acid (or an ester derivative thereof), and 100 mole equivalents ethylene glycol. The terephthalic acid may be replaced in whole or in part by naphthalene dicarboxylic acid such as dimethyl 2,6-napthalene dicarboxylic acid (or an ester derivative thereof). In another preferred embodiment, a portion of the sebacic acid is replaced by an equivalent amount of cyclohexane dicarboxylic acid (or an ester derivative thereof). Useful tear resistant multilayer films are described in U.S. Pat. Nos. 6,040,061 and 5,604,019, and are incorporated by reference herein to the extent they do not conflict with the disclosure herein.

In many embodiments, the tear resistant multilayer film article has an average visible light transmission of at least 40% and an infrared light transmission of 20% or less for substantially all wavelengths between 950 nm and 2500 nm. The tear resistant multilayer film article can have a visible light transmission of at least 40%, a shading coefficient value of at least 0.68, and a moisture vapor transmission rate of at least 1 $g/m^2 \cdot day$, measured at 38 degrees centigrade and 100% relative humidity.

The above tear resistant multilayer film article constructions provide improved tear resistant solar control film articles. In some embodiments, the tear resistant multilayer solar control articles have an average visible light transmission (400 to 780 nm) of at least 40% and an average infrared light transmission for 780 nm to 2500 nm light of less than 10% or less than 15%. In some embodiments, the tear resistant multilayer solar control article has an average visible light transmission of at least 60% and an infrared light transmission of 20% or less for substantially all wavelengths between 950 nm and 2500 nm. In some embodiments, the tear resistant solar control multilayer article has an average light reflection between 780 and 1200 nm of 50% or greater and an average light transmission between 1400 and 2500 nm of 50% or less. In further embodiments, the tear resistant solar control multilayer article has an average light reflection between 780 and 1200 nm of 80% or greater and an average light transmission between 1400 and 2500 nm of 20% or less. In still further embodiments, the tear resistant solar control multilayer article has an average light reflection between 780 and 1200 nm of 90% or greater and an average light transmission between 1400 and 2500 nm of 5% or less.

EXAMPLES

Multilayer IR Reflecting Film Preparation

A multilayer film containing about 446 layers was made on a sequential flat-film making line via a coextrusion process. This multilayer polymer film was made from coPEN and PETG (available from Eastman Chemicals). The coPEN was polymerized with 90% PEN and 10% PET starting monomers. A feedblock method (such as that described by U.S. Pat. No. 3,801,429) was used to generate about 223 optical layers with an approximately linear layer thickness gradient from layer to layer through the extrudate.

The coPEN was delivered to the feedblock by an extruder at a rate of about 132 lb/hr and the PETG at about 160 lb/hr. A portion of the PETG is used as protective boundary layers (PBL's) on each side of the extrudate with about 32 lb/hr flow total. The material stream then passed though an asymmetric two times multiplier with a multiplier design ratio of about 1.25. Multiplier concepts and function are described in U.S. Pat. Nos. 5,094,788 and 5,094,793. The multiplier ratio is defined as the average layer thickness of layers produced in the major conduit divided by the average layer thickness of layers in the minor conduit. This multiplier ratio was chosen so as to provide a small overlap of the two reflectance bands created by the two sets of 223 layers. Each set of 223 layers has the approximate layer thickness profile created by the feedblock, with overall thickness scale factors determined by the multiplier and film extrusion rates. After the multiplier, skin layers were added at about 72 lbs/hour (total) that was fed from a third extruder. Then the material stream passed through a film die and onto a water cooled casting wheel.

The PETG melt process equipment was maintained at about 500° F., the coPEN (both optics and skin layers) melt process equipment was maintained at about 525° F., and the feedblock, multiplier, skin-layer meltstream, and die were maintained at about 525° F. The feedblock used to make the film for this example was designed to give a linear layer thickness distribution with a 1.3:1 ratio of thickest to thinnest layers under isothermal conditions. Errors in this layer profile are corrected with the axial rod heater profile, as described in U.S. Pat. No. 6,827,886, which is incorporated by reference herein. The casting wheel speed was adjusted for precise control of final film thickness, and therefore, final bandedge position.

The inlet water temperature on the casting wheel was about 7° Celsius. A high voltage pinning system was used to pin the extrudate to the casting wheel. The pinning wire was about 0.17 mm thick and a voltage of about 6.5 kV was applied. The pinning wire was positioned manually by an operator about 3 to 5 mm from the web at the point of contact to the casting wheel to obtain a smooth appearance to the cast web. The cast web was continuously oriented by conventional sequential length orienter (LO) and tenter equipment. The web was length oriented to a draw ratio of about 3.8 at about 270° F. The film was preheated to about 255° F. in about 15 seconds in the tenter and drawn in the transverse direction to a draw ratio of about 3.5 at 270° F. The film was heat set in the tenter oven at a temperature of about 460° F. for about 30 seconds. The finished film had a final thickness of about 0.0035 inches.

MVTR Test Method

Moisture (water) vapor transmission rates may be measured using ASTM F-1249. MVTR measurement devices marketed under trademark Permatran by Mocon, Inc., Minneapolis.

Example 1

Figure 1A:
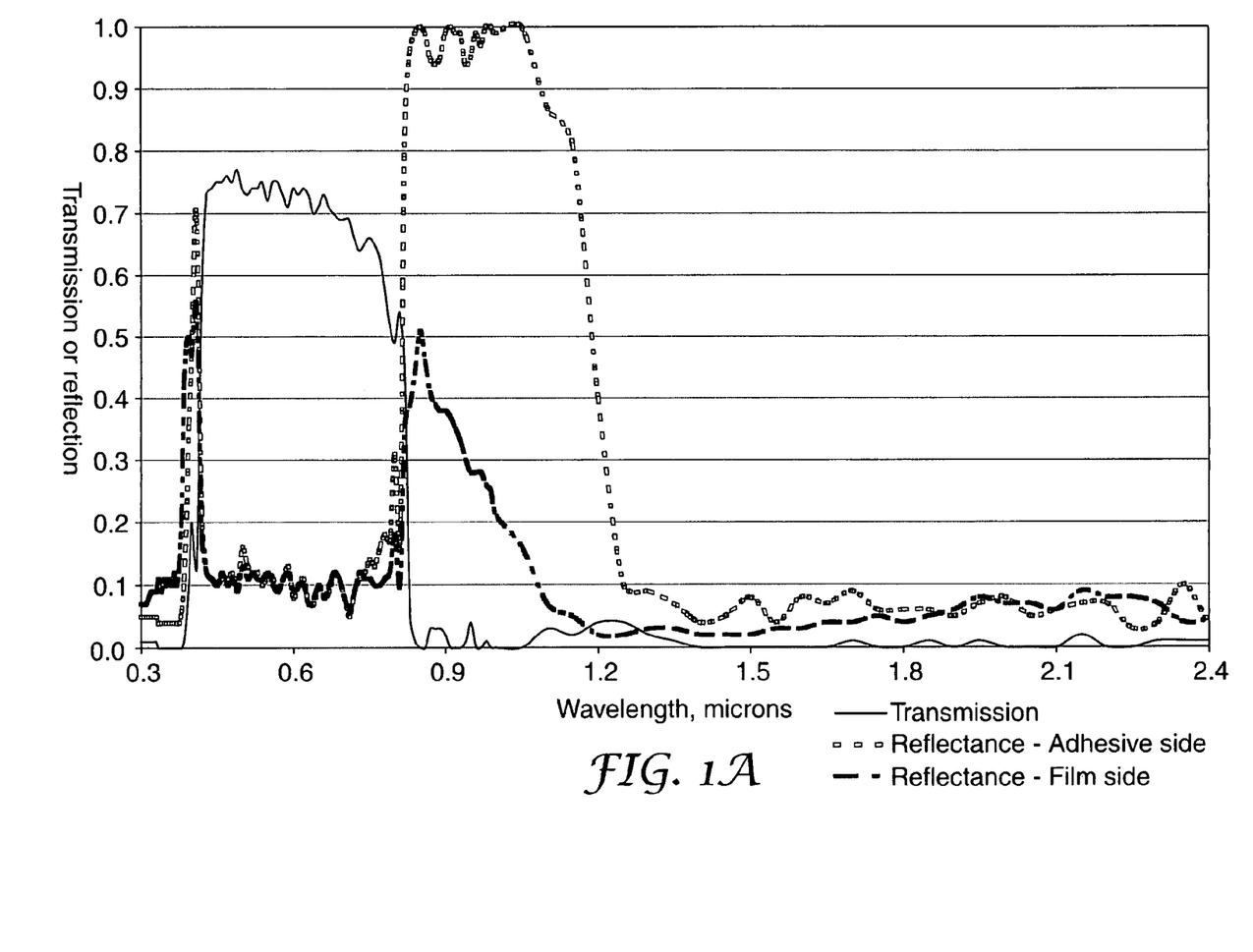
FIG. 1A is an optical transmission and reflection spectra of film prepared according to Example 1 with the adhesive side towards the light source.
Figure 1B:
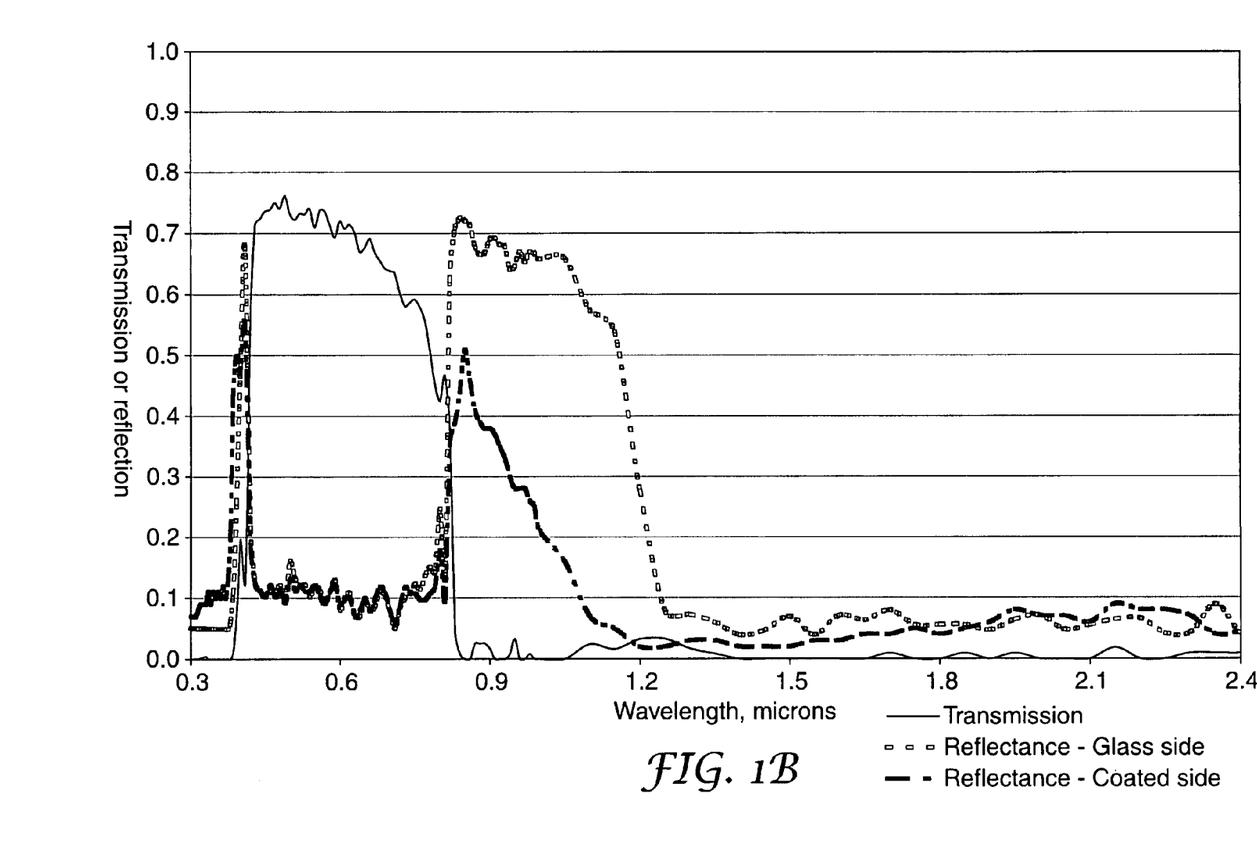
FIG. 1B is an optical transmission and reflection spectra of film prepared according to Example 1 laminated to a 3 mm clear glass with the adhesive side towards the sun.
Figure 1C:
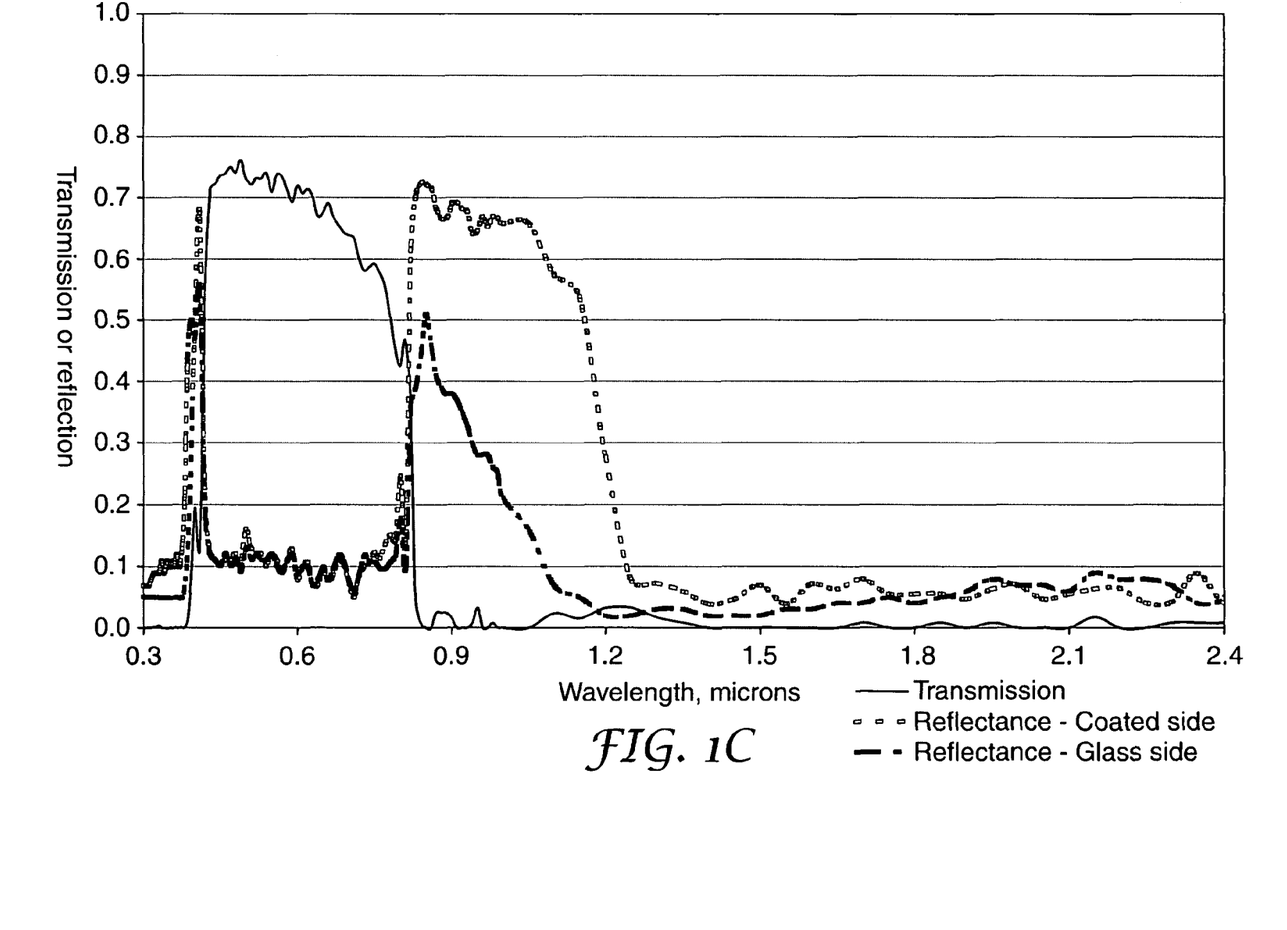
FIG. 1C is an optical transmission and reflection spectra of film prepared according to Example 1 laminated to a 3 mm clear glass with the adhesive side away from the sun.

An ultrafine dispersion of Antimony doped Indium Tin Oxide (A-ITO) particles in Methyl Cellosolve available from Advanced Nano Products Ltd., South Korea under the designation TRB Paste SM6080 was mixed with Methyl Ethyl Ketone to reduce the solid content in the dispersion from 60 to 45%. This solution was coated on the multilayer film described above using an extrusion die coating process. For a complete description of the die coating technique see "Modern Coating and Drying Technology," Eds. E. D. Cohen, E. B. Gutoff, VCH Publishers, NY, 1992). The extrudate flow rate was set at 330 g/min. (measured using a Micromotion™ flow meter, Micro Motion Inc., Boulder, Colo., USA), the web speed at 50 feet per minute and the coated width at 42 inches. The coating was dried to remove solvent from the dispersion at 93 degrees Celsius and cured using a Fusion UV lamp system fitted with type D lamp operating at 80% power setting. This process resulted in the cured coating having a coating weight of approx. 0.7 g/ft². The dried and cured A-ITO was further coated with a pressure sensitive adhesive on the surface opposite to the A-ITO and a silicone coated release liner (available from CP Films, Martinsville, Va., USA) laminated to it. The release liner was removed and the optical transmission and reflection spectra measured using a Lambda 19 spectrophotometer (Perkin Elmer, Boston, Mass.). The spectra were imported into Optics5 and Window 5.2 programs available from Lawrence Berkeley National Laboratories for analyzing thermal and optical properties of glazing systems. Performance characteristics such as visible light transmission (VLT), visible light reflection (VLR), shading coefficient (SC), interior reflection ($R_{int}$), exterior reflection ($R_{ext}$), U-value, etc. are determined using the Window 5.2 program. The programs can be downloaded from http://windows.lbl.gov/software/. The reflection and transmission spectra of the coated film are shown in FIG. 1a. The characteristics of a glazing system prepared by laminating the above described film to a 3 mm clear glass (PPG clear glass, NFRC ID: 5009) with the adhesive side towards the light source (sun) is shown in Table 1. The transmission and reflection spectra after lamination to the 3 mm glass substrate are shown in FIGS. 1b and 1c. The same film was laminated with the A-ITO surface towards the sun and the glazing system recalculated using the same software. The results are shown in Table 1.

Example 2

Figure 2:
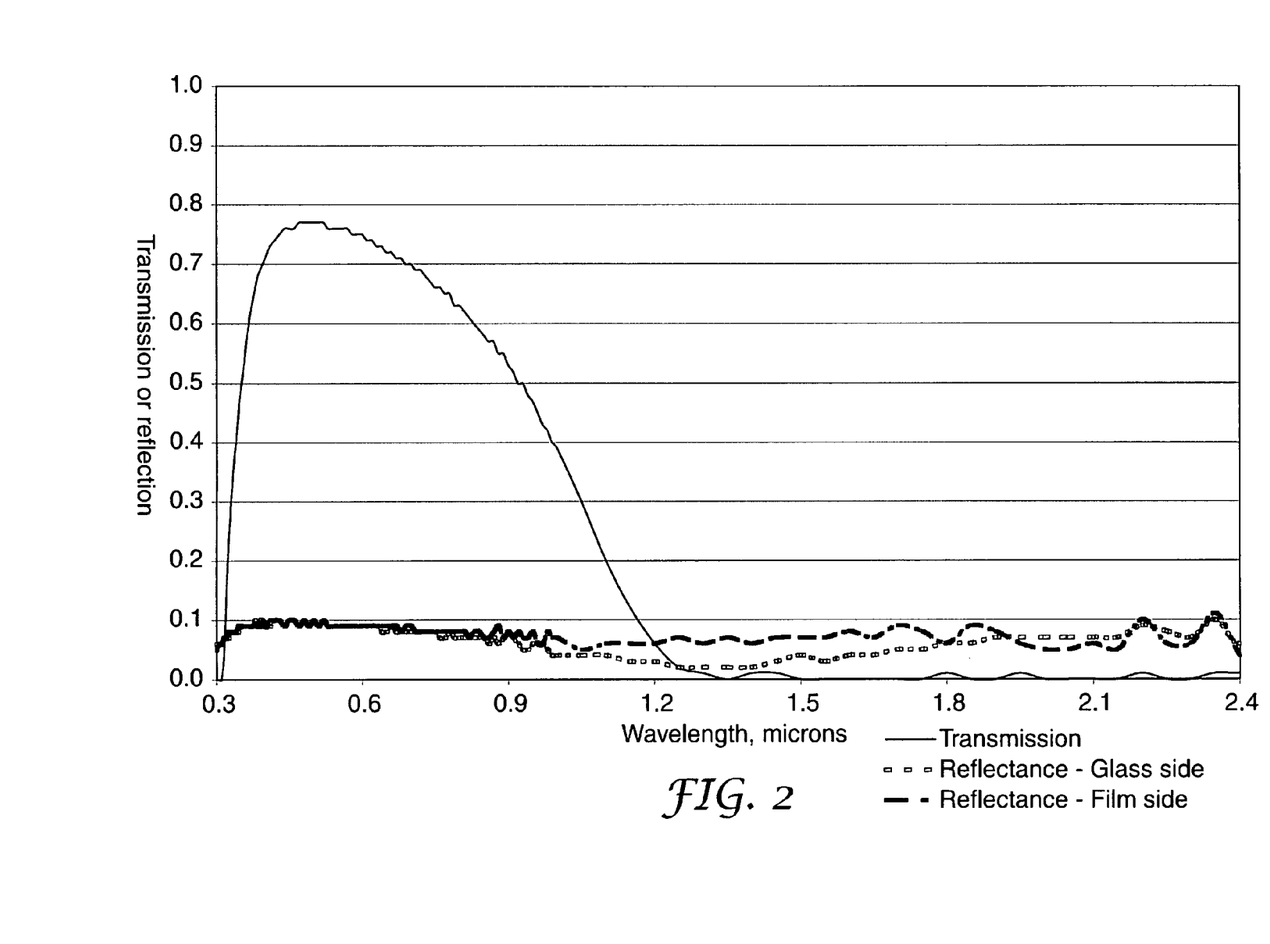
FIG. 2 is an optical transmission and reflection spectra of film prepared according to Example 2.

An ultrafine dispersion of Antimony doped Indium Tin Oxide (A-ITO) particles in Methyl Cellosolve available from under the designation TRB Paste SM6080 was obtained from Advanced Nano Products Ltd., South Korea. This solution was coated onto a 0.05 mm PET substrate available from Teijin Corp., Japan, under the trade designation HPE50 with a Yasui Seiki Lab Coater, Model CAG-150 (Yasui Seiki Co., Bloomington, Ind.) using a microgravure roll of 381 helical cells per lineal cm (150 helical cells per lineal inch). The coating was in-line dried at 95° C. and UV-cured at 6.1 m/min using a Fusion Systems Model 1600 (400 W/in) W curing system fitted with D-bulb. The dried coating had a thickness of approximately 3.6 micrometer. The optical transmission and reflection spectra of this film measured as done in example 1 are shown in FIG. 2. The glazing system prepared by laminating this film to a 6 mm PPG clear glass is shown in Table 1.

Example 3

Figure 3:
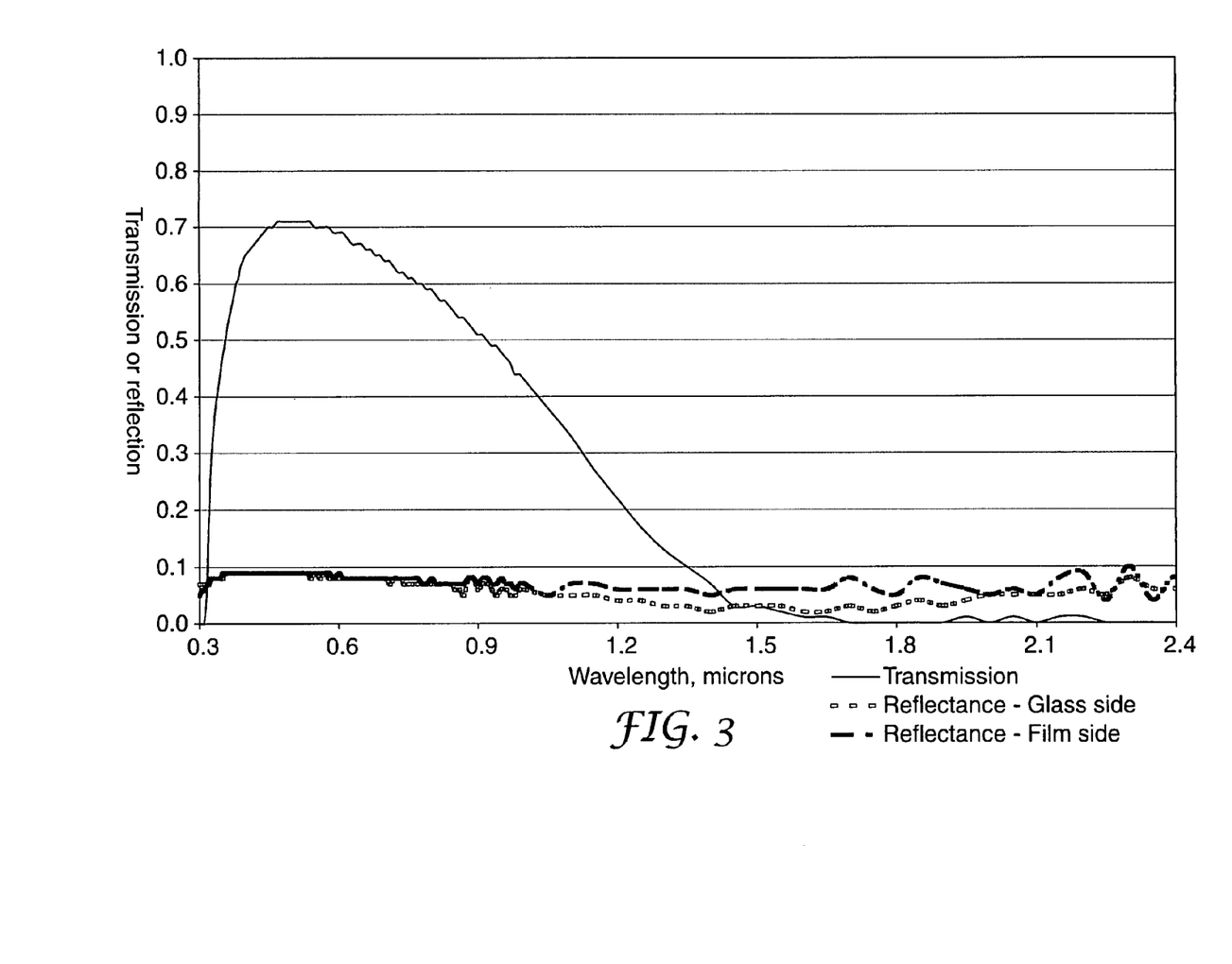
FIG. 3 is an optical transmission and reflection spectra of film prepared according to Example 3.

An ultrafine dispersion of Antimony doped Tin Oxide (ATO) particles in Methyl Cellosolve available from under the designation TRB Paste SL6060 was obtained from Advanced Nano Products Ltd., South Korea. This solution was coated onto a 0.05 mm PET substrate available from Teijin Corp., Japan, under the trade designation HPE50 with a Yasui Seiki Lab Coater, Model CAG-150 (Yasui Seiki Co., Bloomington, Ind.) using a microgravure roll of 381 helical cells per lineal cm (150 helical cells per lineal inch). The coating was in-line dried at 95° C. and UV-cured at 6.1 m/min using a Fusion Systems 6000 (600 W/in) W curing system fitted with D-bulb. The dried coating had a thickness of approximately 3.6 micrometer. The optical transmission and reflection spectra of this film measured as in example 1 are shown in FIG. 3. The glazing system prepared by laminating this film to a 6 mm PPG clear glass is shown in Table 1.

Example 4

The TRB paste SL6060 was coated on multilayer film, described above, using a meyer bar coating technique using Meyer bar #5(example 4a), #8 (example 4b) and #14 (example 4c.) The coatings were dried in an oven at 93° C. for 10 min and cured under Fusion UV lamps (300 W/in at 20 fpm) and optical transmission spectra of the samples measured. The spectra were imported into Optics5 and Window 5.2. The optical and thermal characteristics of glazing systems prepared with 3 mm clear glass are shown in Table 1.

TABLE 1

| Sample description | Tvis | Shading Coeff. | Rint | Rext |
|---|---|---|---|---|
| Example 1 with A-ITO coating away from sun | 72 | 0.54 | 11.1 | 10.8 |

TABLE 1-continued

| Sample description | Tvis | Shading Coeff. | Rint | Rext |
|---|---|---|---|---|
| Example 1 with A-ITO coating away from sun | 72 | 0.59 | 10.8 | 11.1 |
| Example 2 | 73 | 0.68 | 9 | 9 |
| Example 3 | 74 | .73 | 9 | 9 |
| Example 4a | 72 | 0.57 | 13 | 13 |
| Example 4b | 63 | 0.51 | 12 | 10 |
| Example 4c | 55 | 0.47 | 12 | 9 |

Example 5

A dispersion of Antimony Tin Oxide (Inframat Advanced Materials LLC, CT product designation 50N-5190-2) in a multi-functional acrylate monomer mixture was prepared by milling together 30 g. of ATO, 7.5 g. of pentaerithritol tetra acrylate (Sartomer Company, PA, product designation SR295) and 7.5 g. of 1,6-hexanedioldiacrylate (Sartomer Company, PA, product designation SR238) and 1-methoxy-2-propanol. 0.15 g each of photoinitiators Irgacure 819 and Irgacure 184 (both from CIBA Specialty Chemicals, Basel, Switzerland) were added to the above dispersion and coated on the multilayer polymer film described above. The coating process was conducted as described in Example 1. The coating was cured and the resulting cured coating was tested in a Taber abrader according to ASTM D 1044-99 under a load of 500 g and 50 cycles. This resulted in a haze of less than 4% measured with Haze-Gard Plus (BYK-Gardner, MD) haze meter.

Example 6

A tear resistant laminate made up of two layers of tear resistant multilayer film (made according to the procedure described in U.S. Pat. No. 6,040,061, for example, see Example 6) was made by coating a non-corona treated side of one tear resistant multilayer film with Vitel 3300 laminating adhesive at a weight of approx. 0.2 g/ft$^2$ and dried. Vitel 3300 Polyester Resin is commercially available from Bostik, Inc. Massachusetts, USA. This dried film was then laminated to the second tear resistant multilayer film at a temperature of 90 degrees Celsius. The laminate is then further processed with a corona treatment and an acrylic pressure sensitive adhesive (PSA) is coated at an approx coating weight of 2.1 g/ft$^2$ and dried. The PSA layer is then coated with a water based dispersion of Dow Methocel A15LV (i.e., overcoat) and dried. The coated PSA layer is then laminated to a polyester release liner.

A multilayer IR reflecting film was prepared using alternating PET and CoPMMA layers made according to the procedure described in U.S. Pat. No. 6,797,396 (for example, see Example 5). An ultrafine dispersion of Antimony Tin Oxide (ATO) particles in 1-methoxy-2-propanol available from Advanced Nano Products Ltd., South Korea under the designation TRB Paste SR 6070 was coated on this multilayer IR reflecting film using an extrusion die coating process. The coating was dried to remove solvent from the dispersion at 93 degrees Celsius and cured using a Fusion UV lamp system fitted with type D lamp operating at 60% power setting. This process resulted in the cured IR absorbing coating having a coating weight of approx. 0.7 g/ft$^2$.

The tear resistant film laminate was then laminated to the ATO coated, IR reflecting film using Vitel 3300 Polyester resin laminating adhesive, at a coating weight of approx. 0.2 g/ft$^2$. The final tear resistant solar control article construction is illustrated by FIG. 5, described above.

The release liner was removed and moisture vapor transmission rate was measured according to ASTM F-1249 test method using Permatran® model W-700 device available from Mocon, Inc. at 38 degrees centigrade and 100% RH. MVTR of a commercially available tear resistant film from Glasslock, inc. under the designation SD1010 (http://www-.glasslock.com/documents/GlassLock%20Brochure%20060503.pdf) was also tested under the same conditions. The results are shown in the Table below.

| Sample ID | MVTR (g/m$^2$ day) |
|---|---|
| Example 6 | 6.0 |
| SD 1010 | <0.005* |

*below detection limit

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the instant specification.

We claim:
1. A multilayer film article comprising:
an infrared light reflecting multilayer film having alternating polymeric layers of a first polymer type and a second polymer type and the alternating polymeric layers cooperate to reflect infrared light;
an infrared light absorbing nanoparticle layer comprising a plurality of metal oxide nanoparticles dispersed in a cured polymeric binder, the infrared light absorbing nanoparticle layer being adjacent the infrared light reflecting multilayer film; and
a tear resistant polymeric film disposed adjacent to the infrared light reflecting multilayer film, wherein the tear resistant polymeric film comprises a multilayer film or a monolithic polymeric film wherein the monolithic polymeric film has a thickness of at least 175 micrometers up to 1 centimeter.
2. A multilayer film article according to claim 1 wherein the metal oxide nanoparticles comprises antimony tin oxide, doped antimony tin oxide, indium doped tin oxide, or antimony doped indium tin oxide dispersed in a cured polyacrylate binder.
3. A multilayer film article according to claim 1 wherein the multilayer film article has a moisture vapor transmission rate value of 1 g/m$^2$·day or greater.
4. A multilayer film article according to claim 1 wherein the infrared light absorbing nanoparticle layer has a thickness in a range from 1 to 20 micrometers.
5. A multilayer film article according to claim 1 wherein the multilayer film article has a visible light transmission value of 40% or greater and a shading coefficient value of at least 0.68.
6. A multilayer film article according to claim 1 further comprising a pressure sensitive adhesive layer disposed on the tear resistant film, the tear resistant multilayer film disposed between the pressure sensitive adhesive layer and the infrared light reflecting multilayer film.

7. A multilayer film article according to claim 6 further comprising a water soluble overcoat layer disposed on the pressure sensitive adhesive layer.

8. A multilayer film article according to claim 7 further comprising a release liner disposed on the overcoat layer.

9. A multilayer film article according to claim 1 wherein the tear resistant film is a multilayer film comprising alternating layers of a stiff polymer and a ductile polymer.

10. A multilayer film article according to claim 9 wherein the multilayer tear resistant film has a Graves elongation at break of at least 20% and a tensile modulus of at least 175 kpsi in at least one direction of the multilayer tear resistant film.

11. A multilayer film article according to claim 1 wherein the tear resistant film comprises at least two multilayer tear resistant film layers.

12. A shatterproof light control article for blocking infrared light emitted from an infrared light source comprising:
an infrared light reflecting multilayer film having alternating polymeric layers of a first polymer type and a second polymer type and the alternating polymeric layers cooperate to reflect infrared light;
an infrared light absorbing nanoparticle layer comprising a plurality of metal oxide nanoparticles dispersed in a cured polymeric binder, the infrared light absorbing nanoparticle layer being adjacent the infrared light reflecting multilayer film;
a glass substrate disposed adjacent the infrared light reflecting multilayer film; and
a tear resistant polymeric film disposed between the infrared light reflecting multilayer film and the glass substrate, wherein the tear resistant polymeric film comprises a multilayer film or a monolithic polymeric film wherein the monolithic polymeric film has a thickness of at least 175 micrometers up to 1 centimeter.

13. A shatterproof light control article according to claim 12 wherein the infrared light absorbing nanoparticle layer has a thickness in a range from 1 to 20 micrometers.

14. A shatterproof light control article according to claim 12 wherein the shatterproof light control article has a visible light transmission value of 40% or greater and a shading coefficient value of at least 0.68.

15. A shatterproof light control article according to claim 12 further comprising a pressure sensitive adhesive layer disposed between the tear resistant film and the glass substrate.

16. A tear resistant multilayer film article comprising:
an infrared light reflecting multilayer film having alternating polymeric layers of a first polymer type and a second polymer type and the alternating polymeric layers cooperate to reflect infrared light;
an infrared light absorbing nanoparticle layer comprising a plurality of metal oxide nanoparticles dispersed in a cured polymeric binder, the infrared light absorbing nanoparticle layer being adjacent the infrared light reflecting multilayer film; and
a tear resistant polymeric film disposed adjacent to the infrared light reflecting multilayer film, wherein the tear resistant polymeric film comprises a multilayer film or a monolithic polymeric film wherein the monolithic polymeric film has a thickness of at least 175 micrometers up to 1 centimeter;
wherein, the tear resistant multilayer film article has an average visible light transmission of at least 40% and an infrared light transmission of 20% or less for substantially all wavelengths between 950 nm and 2500 nm.

17. A tear resistant multilayer film article according to claim 16 wherein the tear resistant multilayer film article has a shading coefficient value of at least 0.68.

18. A tear resistant multilayer film article according to claim 16 wherein the tear resistant multilayer film article has a moisture vapor transmission rate of 1 $g/m^2 \cdot day$ or greater.

19. A tear resistant multilayer film article according to claim 16 wherein the tear resistant film has a Graves elongation at break of at least 20% and a tensile modulus of at least 175 kpsi in at least one direction of the tear resistant film.

20. A tear resistant multilayer film article according to claim 16 wherein the tear resistant film comprises at least two tear resistant multilayer film layers.

* * * * *

UNITED STATES PATENT AND TRADEMARK OFFICE
CERTIFICATE OF CORRECTION

PATENT NO. : 7,906,202 B2  
APPLICATION NO. : 11/528158  
DATED : March 15, 2011  
INVENTOR(S) : Raghunath Padiyath et al.

Page 1 of 1

It is certified that error appears in the above-identified patent and that said Letters Patent is hereby corrected as shown below:

In the Specification

Column 8  
Line 16, Delete "DARACUR" and insert -- DAROCUR --, therefor.  
Line 44, Delete "SAME." and insert -- SAME (Attorney Docket number 62445US002). --, therefor.  
Line 55, Delete "nanparticle" and insert -- nanoparticle --, therefor.  
Line 55, Delete "disspative" and insert -- dissipative --, therefor.

Column 9  
Line 10, Delete "adherand," and insert -- adherend, --, therefor.

Column 10  
Line 40, Delete "polystryrene)," and insert -- polystyrene), --, therefor.

Column 11  
Line 44, Delete "gylcol" and insert -- glycol --, therefor.

Signed and Sealed this  
Twenty-sixth Day of November, 2013

Margaret A. Focarino  
*Commissioner for Patents of the United States Patent and Trademark Office*